(12) United States Patent
Pinault

(10) Patent No.: US 10,359,015 B2
(45) Date of Patent: Jul. 23, 2019

(54) INTAKE ARRANGEMENT

(71) Applicant: MAN DIESEL & TURBO SE, Augsburg (DE)

(72) Inventor: Philippe Pinault, Saint André des Eaux (FR)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 15/537,364

(22) PCT Filed: Dec. 17, 2015

(86) PCT No.: PCT/EP2015/080142
§ 371 (c)(1),
(2) Date: Jun. 16, 2017

(87) PCT Pub. No.: WO2016/097087
PCT Pub. Date: Jun. 23, 2016

(65) Prior Publication Data
US 2017/0370336 A1    Dec. 28, 2017

(30) Foreign Application Priority Data

Dec. 20, 2014 (DE) .......... 10 2014 019 425

(51) Int. Cl.
*F02M 37/22* (2019.01)
*F02M 37/50* (2019.01)
(Continued)

(52) U.S. Cl.
CPC .......... *F02M 37/22* (2013.01); *B60K 15/061* (2013.01); *B60K 15/077* (2013.01);
(Continued)

(58) Field of Classification Search
CPC ............ F02M 21/0242; F02M 59/464; F02M 2700/438; F02M 37/22; F02M 37/50;
(Continued)

(56) References Cited

U.S. PATENT DOCUMENTS 2,440,815 A * 5/1948 Wharam ............. F01M 11/065
184/103.1
4,422,413 A * 12/1983 Pederson ............... F02D 19/12
123/1 A
(Continued)

FOREIGN PATENT DOCUMENTS

DE         10 93 142       11/1960
DE    20 2005 003383        5/2005
(Continued)

OTHER PUBLICATIONS

Office Action dated Oct. 15, 2018 issued in Chinese Patent Application No. 201580069757.9.
(Continued)

*Primary Examiner* — Mahmoud Gimie
*Assistant Examiner* — Joshua Campbell
(74) *Attorney, Agent, or Firm* — Cozen O'Connor

(57) ABSTRACT

Intake arrangement for an internal combustion engine for the intake of a liquid medium from a container, having a strainer, via which liquid medium can be taken in from the container, and at least one suction pipe which opens with a first end into the strainer and via which the liquid medium can be delivered towards a suction pump, which interacts with the respective suction pipe. The suction pipe is mounted at a second end that faces away from the strainer such that it can be pivoted about an axis such that the suction pipe follows a movement of the liquid within the container.

9 Claims, 6 Drawing Sheets

(51) Int. Cl.
*B60K 15/06* (2006.01)
*B60K 15/077* (2006.01)
*F01M 11/06* (2006.01)
*F02M 37/00* (2006.01)
*F02M 37/10* (2006.01)
*F02M 59/46* (2006.01)
*F02M 21/02* (2006.01)
*B01D 35/027* (2006.01)
*B01D 35/02* (2006.01)
*F01M 11/00* (2006.01)
*B60K 15/03* (2006.01)

(52) U.S. Cl.
CPC ...... *F01M 11/064* (2013.01); *F02M 37/0023* (2013.01); *F02M 37/0082* (2013.01); *F02M 37/103* (2013.01); *F02M 37/50* (2019.01); *B01D 35/023* (2013.01); *B01D 35/027* (2013.01); *B60K 2015/03105* (2013.01); *B60K 2015/03217* (2013.01); *B60K 2015/03236* (2013.01); *B60K 2015/03453* (2013.01); *F01M 2011/007* (2013.01); *F02M 21/0242* (2013.01); *F02M 59/464* (2013.01); *F02M 2700/438* (2013.01)

(58) Field of Classification Search
CPC ........... F02M 37/0023; F02M 37/0082; F02M 37/103; B60K 2015/03217; B60K 15/061; B60K 15/077; B60K 2015/03105; B60K 2015/03236; B60K 2015/03453; F01M 2011/007; B01D 35/023; B01D 35/027
USPC ................................. 123/495, 497, 509, 510
See application file for complete search history.

(56) References Cited

U.S. PATENT DOCUMENTS

| | | | | | |
|---|---|---|---|---|---|
| 4,693,820 | A | * | 9/1987 | Baxter | B01D 29/15 210/232 |
| 4,780,197 | A | * | 10/1988 | Schuman | B01D 29/21 210/136 |
| 4,790,185 | A | * | 12/1988 | Fedelem | G01F 23/30 137/565.24 |
| 5,040,516 | A | * | 8/1991 | Haraguchi | B60K 15/061 123/509 |
| 6,029,633 | A | | 2/2000 | Brandt | |
| 6,260,543 | B1 | * | 7/2001 | Chih | B01D 35/027 123/509 |
| 6,308,733 | B2 | * | 10/2001 | Murakoshi | B60K 15/077 123/509 |
| 6,401,751 | B2 | * | 6/2002 | Murakoshi | B60K 15/077 123/509 |
| 6,530,393 | B2 | * | 3/2003 | Reinelt | B60K 15/04 137/256 |
| 6,679,226 | B2 | * | 1/2004 | Burke | G01N 33/2829 123/509 |
| 2001/0001963 | A1 | * | 5/2001 | Murakoshi | B60K 15/077 137/565.34 |
| 2001/0047827 | A1 | * | 12/2001 | Murakoshi | B60K 15/077 137/565.34 |
| 2004/0140257 | A1 | * | 7/2004 | Dockery | B01D 35/0273 210/416.4 |
| 2006/0076287 | A1 | * | 4/2006 | Catlin | B01D 35/0273 210/416.4 |
| 2010/0300952 | A1 | | 12/2010 | Clausen | |
| 2011/0174275 | A1 | * | 7/2011 | Lim | F02M 37/025 123/509 |

FOREIGN PATENT DOCUMENTS

| | | | | |
|---|---|---|---|---|
| DE | 202005003383 U1 | * | 5/2005 | ............ F02F 7/00 |
| DE | 10 2010 024228 | | 12/2011 | |
| DE | 102010024228 A1 | * | 12/2011 | ......... F01M 11/0004 |
| GB | 593417 | | 10/1947 | |

OTHER PUBLICATIONS

Office Action dated Sep. 12, 2018 issued in the corresponding Korean Patent Application No. 10-2017-7019658.

* cited by examiner

INTAKE ARRANGEMENT

CROSS REFERENCE TO RELATED APPLICATIONS

This is a U.S. national stage of application No. PCT/EP2015/080142, filed on Dec. 17, 2015. Priority is claimed on German Application No. DE102014019425.6, filed Dec. 20, 2014; the content of which is incorporated here by reference.

BACKGROUND OF THE INVENTION

1. Field of the Invention

The invention relates to a suction arrangement for an internal combustion engine.

2. Description of Prior Art

To operate an internal combustion engine, it is required to draw in fuel and lubricant from corresponding storage tanks and to make the same available to the internal combustion engine. In particular when the storage tank during operation assumes an inclined position, drawing in the liquid medium from the respective storage tank creates difficulties dependent on the filling level of the storage tank. This is the case for example with offshore applications and marine applications, in which storage tanks employed for example on oil platforms or ships can assume an inclined position of up to 45° relative to a horizontal orientation. To date, no suction arrangements are known which, under such conditions, make possible a universally reliable drawing-in of a liquid medium from a tank.

SUMMARY OF THE INVENTION

The present invention is based on creating a new type of suction arrangement. According to one aspect of the invention, the or each suction pipe is pivotably mounted about an axis at a second end facing away from the suction basket such that the respective suction pipe and thus the suction basket follows a movement of the liquid to be drawn in within the tank initiated by a movement of the tank. Such a suction arrangement makes possible safe drawing-in of the liquid to be drawn in from the tank even in extreme inclined position of the tank.

Preferentially, stops delimit a pivot movement or pendulum movement of the one or each suction pipe and thus of the suction basket. Because of this it is ensured that there is always an adequate distance of a center of gravity of the suction basket from a pivot axis for pivoting the or each suction pipe and thus suction basket for the one or each suction pipe.

According to a further development, the one or each suction pipe is assigned a non-return valve each which in particular when the suction pump reacting with the respective suction pipe is stationary, prevents a return flow of the liquid from the respective suction pipe into the tank. Because of this it is ensured that a defined quantity of liquid is always contained in the respective suction pipe so that immediately after the starting of the respective suction pump liquid can be delivered in the direction of the internal combustion engine independently of the current relevant position of the respective suction pipe and thus of the suction basket.

Preferentially, a filling level sensor is assigned at least to a suction pipe adjacent to the suction basket in the region of the first end of the respective suction pipe. By way of this it can monitored if liquid circulates about the suction basket, i.e. if liquid can actually be drawn.

According to a preferred embodiment of the invention, the suction arrangement comprises two suction pipes which with their first ends open into a common suction basket and the second ends of which are pivotably mounted in such a manner that the second ends of the suction pipes are pivotable about a common pivot axis. Here, the two suction pipes, which are preferentially an integral part of a monolithic suction pipe assembly, substantially run parallel to one another and are deflected at their second ends in opposite directions in such a manner that longitudinal axes of these second ends lie on the common pivot axis. This embodiment of the invention is advantageous for a suction arrangement which serves for drawing in lubricating oil via a main pump and auxiliary pump.

BRIEF DESCRIPTION OF THE DRAWINGS

Exemplary embodiments of the invention are explained in more detail with the help of the drawing without being restricted to this. There it shows.

DETAILED DESCRIPTION OF THE PRESENTLY PREFERRED EMBODIMENTS

The present invention relates to a suction arrangement for drawing in a liquid medium from a tank. Preferentially, such a suction arrangement is employed on an internal combustion engine, which is utilised in an offshore application or a marine application.

In the following, the invention for a suction arrangement is described, which draws in lubricating oil as liquid medium from a lubricating oil reservoir, making it available for lubricating an internal combustion engine.

However, the invention is not restricted to this application. The invention can also be utilised for example for drawing in fuel and to make the same available to an internal combustion engine.

Figure 1:
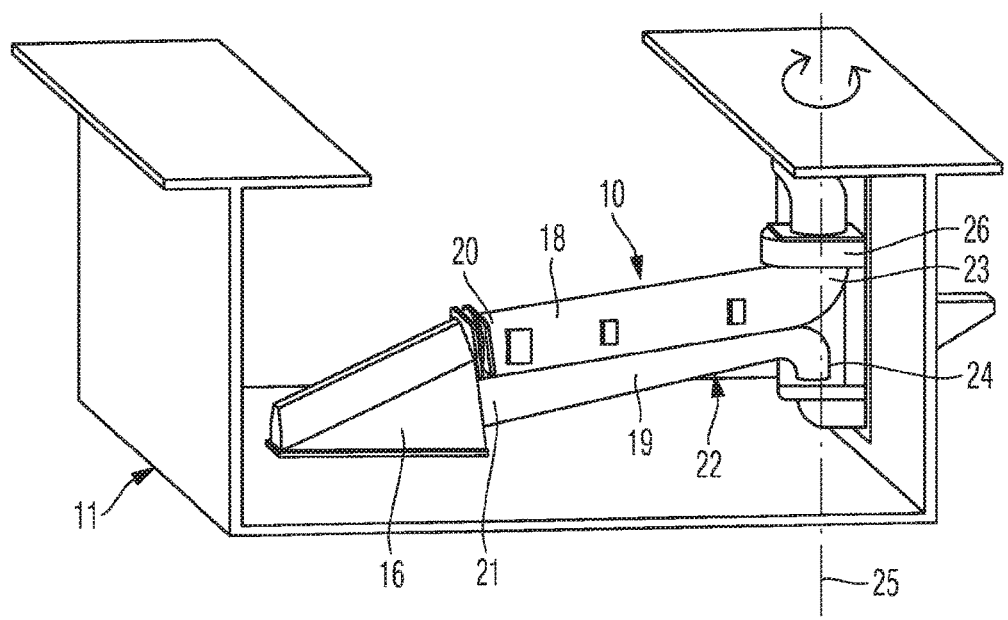
FIG. 1: is a perspective view of a suction arrangement together with a tank.
Figure 2:
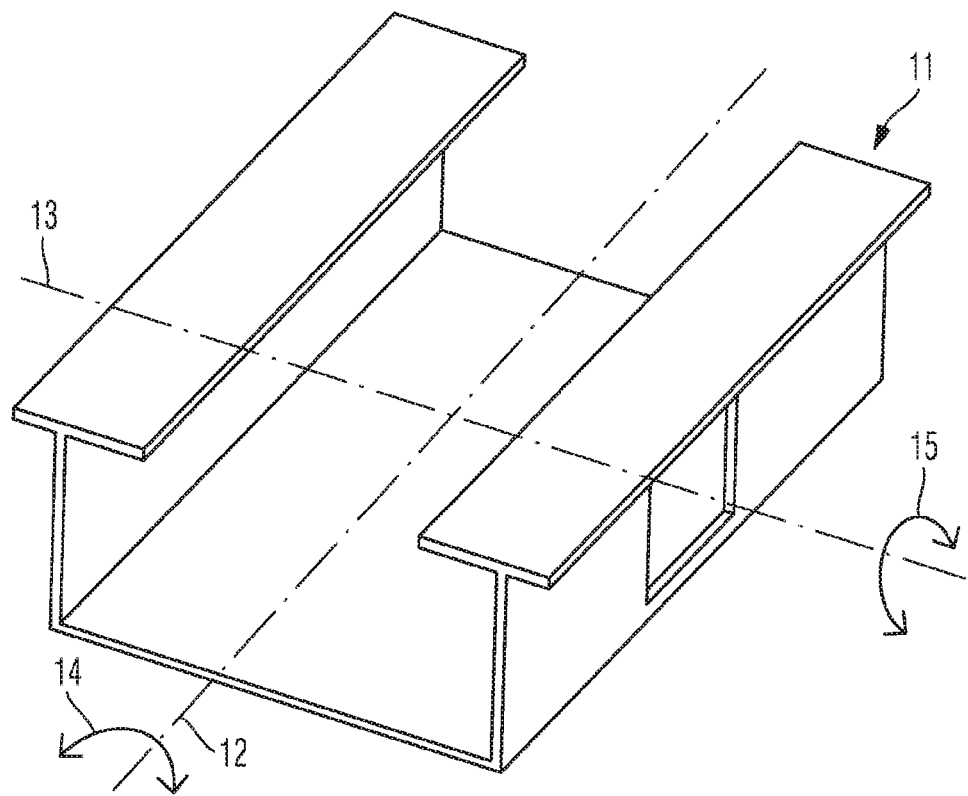
FIG. 2: is the tank of FIG. 1 in sole representation.
Figure 3:
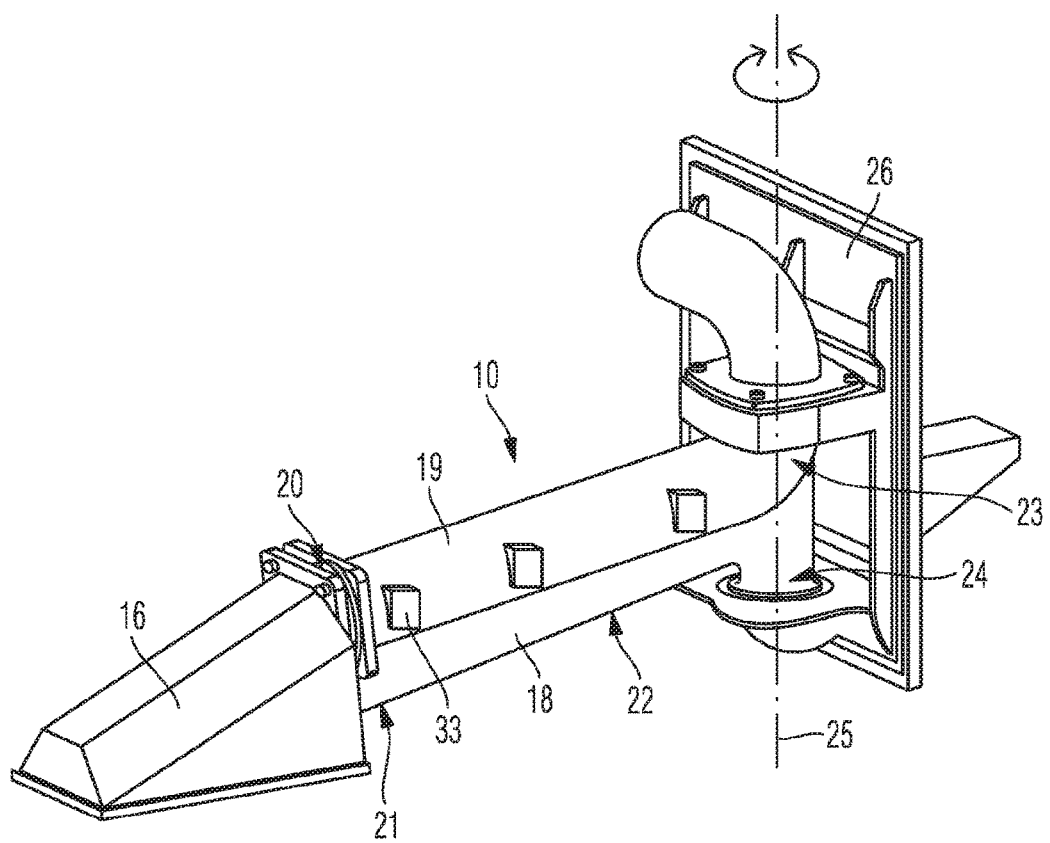
FIG. 3: is the suction arrangement of FIG. 1 in sole representation.

FIG. 1 shows a preferred exemplary embodiment of a suction arrangement 10 according to one aspect of the invention, which in the exemplary embodiment serves for drawing in lubricating oil, namely in combination with a tank 11, in which the lubricating oil to be drawn in is kept ready. The suction arrangement 10 is arranged within the tank 11.

FIG. 1 shows the tank 11, in which the lubricating oil to be drawn in is kept ready, in sole representation. The tank 11 comprises two horizontally extending longitudinal axes 12 and 13, about which the tank 11 can move in the sense of the double arrows 14 and 15 independently of ambient conditions. This is the case in particular with offshore applications and marine applications. The movement about the axis 12 is also described as rolling motion and the movement about the axis 15 as pitching motion.

As a consequence of the shifting of the tank 11 about its axes 14 and 15, the liquid kept ready in the tank 11 and to be sucked in, namely in the shown exemplary embodiment the stored lubricating oil, shifts. In particular when the pivot angle about the or each axis 14 and/or 15 are relatively large and/or the filling level of the lubricating oil in the tank 11 is relatively low, the reliable drawing-in of the lubricating oil from the tank 11 proves to be difficult with suction arrangements known from the prior art. The suction arrangement 10 according to the invention makes possible a safe and reliable drawing-in of lubricating oil stored in the tank 11 under all possible relative positions of the tank 11.

The suction arrangement 10 according to the invention for drawing in the lubricating oil from the tank 11 comprises a suction basket 16, via which the lubricating oil can be drawn in from the tank 11. The suction basket 16 in this case comprises a sieve 17 that prevents that contaminations or solid materials, which are contained in the lubricating oil, to be drawn in as well.

The suction arrangement 10 furthermore comprises at least one suction pipe, namely in the shown exemplary embodiment two suction pipes 18 and 19.

Each suction pipe of the suction arrangement, in the shown exemplary embodiments both suction pipes 18 and 19, opens or open with a first end 20 and 21 respectively into the suction basket 16, wherein via the or each suction pipe 18, 19 the lubricating oil sucked in the region of the suction basket 16 can be delivered in the direction of a delivery pump which is not shown and which interacts with the respective suction pipe 18 and 19 respectively, which ultimately delivers the taken-in liquid medium, namely in the shown exemplary embodiment the lubricating oil, in the direction of an internal combustion engine. In the shown exemplary embodiment, an individual suction pump interacts with each suction pipe 18, 19, namely with the suction pipe 19 a main pump which is not shown, which runs only in particular when the internal combustion engine is running, and with the suction pipe 18, an auxiliary pump, which also runs when the internal combustion engine is stationary. By way of the auxiliary pump and the suction pipe 18, lubricating oil can accordingly be delivered in the direction of the internal combustion engine before the latter itself is operating.

In the shown exemplary embodiment, both suction pipes 18 and 19 are integral part of a monolithic suction pipe assembly 22. In contrast with this it is also possible that both suction pipes 18 and 19 are embodied as individual pipes, which can for example be connected to one another by welding.

In terms of the present invention, the one or each suction pipe 18, 19 is pivotably mounted, at a second end 23 and 24 respectively facing away from the suction basket 16, about an axis 25 on the housing 11, namely a housing wall section 26 of the housing 11, namely in such a manner that the respective suction pipe 18 and 19 and thus the suction basket 16 follow, due to gravity, the movement of the tank 11 or the movement of the liquid to be drawn in initiated by the movement of the tank 11 within the tank 11.

As already explained, the tank 11 can statically or dynamically shift for example due to wave action, about its axes 12 and 13 in the sense of the double arrows 14 and 15, wherein due to the articulated mounting of the suction pipes 18 and 19 and thus of the suction basket 16 on the wall section 26 of the tank 11 the suction pipes 18 and 19 and thus the suction basket 16 then perform or performs a pivot movement or pendulum movement about the axis 25 due to gravity. Accordingly, when the liquid medium to be drawn in, in the shown exemplary embodiment the lubricating oil to be sucked in, shifts because of an inclined position of the tank 11 in a section of the tank 11, the suction arrangement, in particular the suction basket 16, follows this movement of the liquid medium.

In the shown exemplary embodiment, both the second ends 23 and 24 of the two suction pipes 18 and 19 are pivotable about a common pivot axis 25, for the purpose of which in the shown exemplary embodiment the two suction pipes 18, 19, which run substantially parallel to one another, are deflected at their second ends 23 and 24 in opposite directions so that longitudinal axes of these second ends 23 and 24 of the two suction pipes 18 and 19 lie on the common pivot axis 25.

Figure 6:
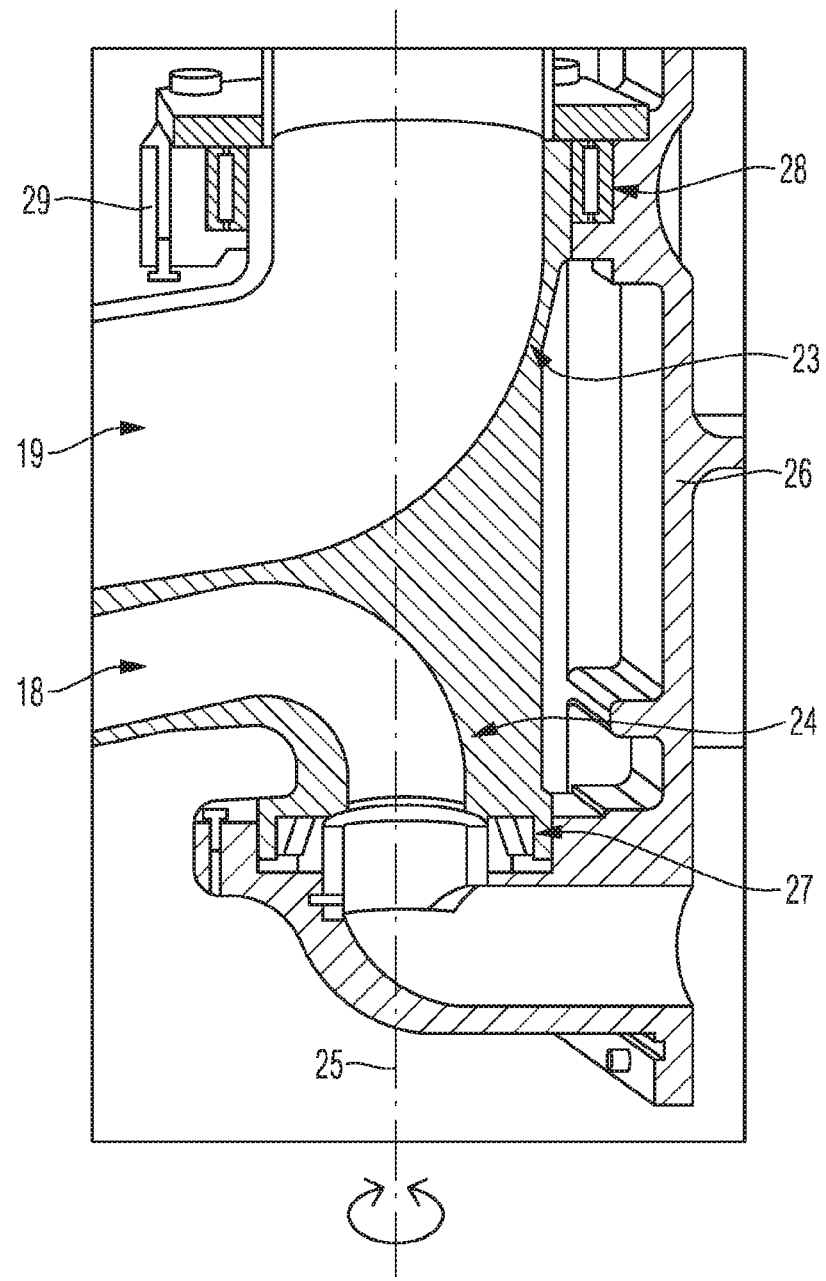
FIG. 6: is a detail of FIG. 5.

The two second ends 23 and 24 of the suction pipes 18 and 19 are assigned bearings 27 and 28, which is best evident from FIG. 6. These bearings 27 and 28 can be rolling bearings or the like.

To ensure a simple assembly, a bearing ring 29 on the tank side, which interacts with the bearing 28 assigned to the second end 23 of the suction pipe 19, can be formed in two parts.

Figure 4:
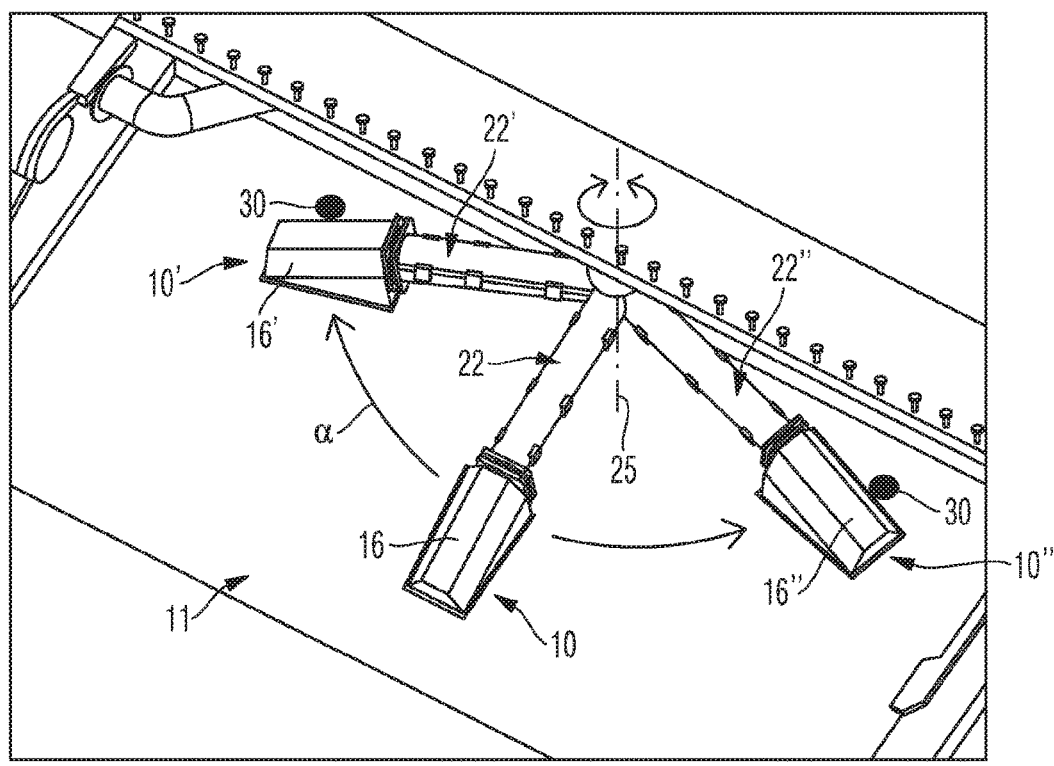
FIG. 4: is the suction arrangement of FIG. 1 in various relative positions regarding the housing.
Figure 5:
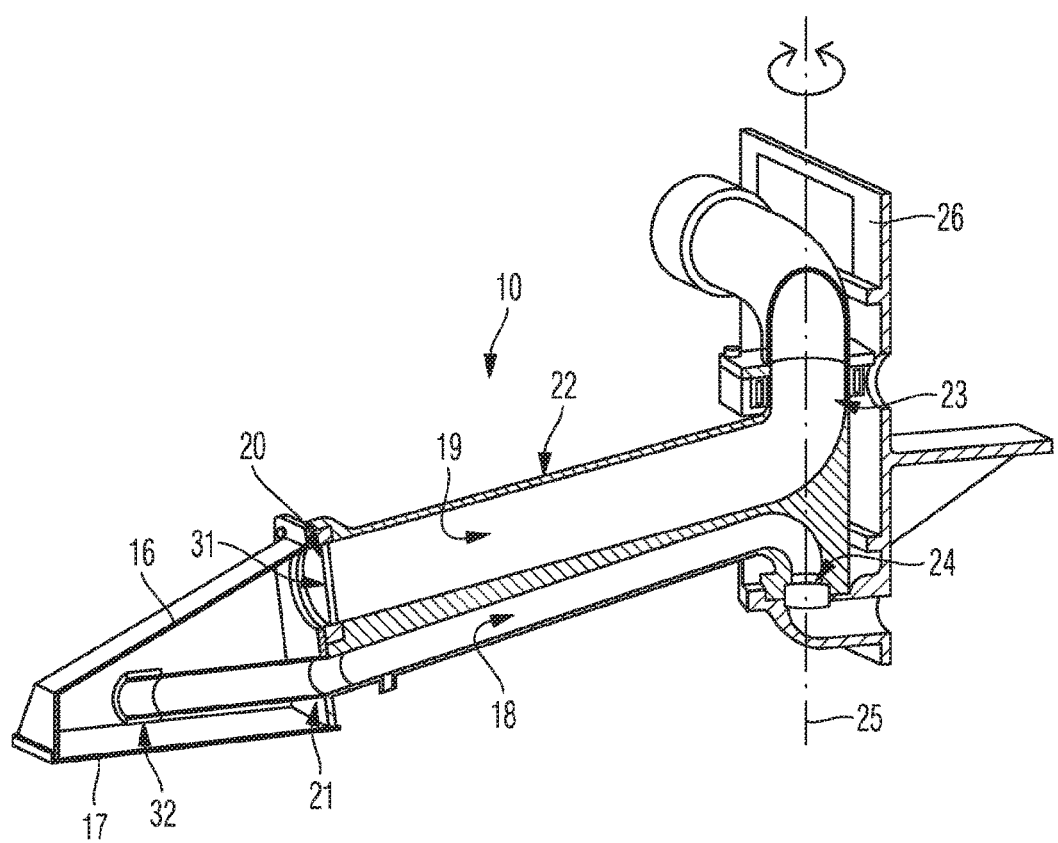
FIG. 5: is a cross section through the suction arrangement of FIGS. 1 and 3.

According to FIG. 4, the pivot movement of the suction arrangement 10 about the pivot axis 25 is delimited by stops 30.

The stops 30 define an angular range α, within which the pivot movement of the or each suction pipe 18, 19 and thus of the suction basket 16 is possible. This angular range α preferentially amounts to a maximum of 150°.

In particular when the suction basket 16 comes to lie against one of the stops 30 as a consequence of an inclined position of the tank 11, there is always an adequate distance between the center of gravity of the suction basket 16 and the pivot axis 25, so that there is an adequate, gravity-dependent torque for shifting the suction arrangement 10 about the pivot axis 25 in all situations.

FIG. 4 shows three different positions of the suction arrangement 10 in the tank 11, wherein dependent on the relative position of the tank 11 the suction arrangement 10 can be shifted in such a manner that the same comes to lie against one of the stops 30. These end positions of the suction arrangement 10 at the stops 30 are shown by the reference numbers 10', 16', 22' as well as 10", 16" and 22" for the suction arrangement 10, the suction basket 16 and the suction pipe assembly 22.

In the shown exemplary embodiment, each of the suction pipes 18, 19 is assigned a non-return valve 31 and 32 respectively. Through these non-return valves 31, 32 it is prevented that lubricating oil, once drawn in via the suction basket 16 into the respective suction pipe 18 and 19 respectively, can return from the respective suction pipe 18, 19. Even in particular when the suction pump interacting with the respective suction pipe 18, 19 accordingly is stationary, a defined lubricating oil quantity remains in the respective suction pipe 18, 19, so that immediately after the activation of the respective suction pump a defined lubricating oil quantity can be delivered, namely independently of whether the suction basket 16 is actually surrounded by lubricating oil to be drawn in.

In the shown preferred exemplary embodiment, the suction pipe assembly 22, which provides the two suction pipes 18 and 19, is assigned a filling level sensor 33 adjacent to the suction basket 16. With this filling level sensor 33 it can be monitored if lubricating oil to be sucked in actually circulates about the suction basket 16, i.e. if lubricating oil can be actually sucked in via the suction basket 16. If this is not the case, a filling level in the tank 11 that is too low can be concluded and a corresponding message for replenishing the tank 11 be generated.

The suction basket 16 of the suction arrangement 10 is preferentially produced from a relatively heavy, metallic material, whereas the or each suction pipe 18, 19 of the suction arrangement 10 is preferentially produced from a relatively light, metallic material. The suction basket 16 can be produced from steel and the or each suction pipe 18, 19 from aluminium. This supports the gravity-dependent shifting of the suction arrangement 10 about the pivot axis 25 as a consequence of the inclined position or movement of the tank 11.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A suction arrangement for an internal combustion engine configured to draw in a liquid medium from a tank, comprising:
    a suction basket from which the liquid medium can be drawn in from the tank;
    a first suction pipe having a first end and a second end, the first end opening into the suction basket and via which the liquid medium is delivered in a direction of a first suction pump, and the second end being arranged at a position opposite the suction basket; and
    a second suction pipe having a first end and a second end, the first end opening into the suction basket and via which the liquid medium is delivered in a direction of a second suction pump, and the second end being arranged at a position opposite the suction basket,
    wherein the second end of the first suction pipe and the second end of the second suction pipe are each pivotably mounted about a common axis such that the first suction pipe, the second suction pipe, and the suction basket follow a movement of the liquid medium within the tank initiated by a movement of the tank, and
    wherein the respective second ends of the first and second suction pipes are deflected in opposite directions such that longitudinal axes of each the respective second ends are on the common axis.

2. The suction arrangement according to claim 1, wherein the first and second suction pipes are substantially parallel to one another.

3. The suction arrangement according to claim 1, wherein the first and second suction pipes are one selected from the group of:
    (i) connected to one another, and
    (ii) an integral part of a monolithic suction pipe assembly.

4. The suction arrangement according to claim 1, further comprising:
    stops configured to delimit a pivot movement of the first suction pipe, the second suction pipe, and the suction basket.

5. The suction arrangement according to claim 4, wherein the stops define an angular range of maximally 150° for the pivot movement.

6. The suction arrangement according to claim 1, wherein the suction basket comprises a sieve.

7. The suction arrangement according to claim 1, further comprising
    non-return valves assigned to the first suction pipe and the second suction pipe and configured to prevent a return flow of the liquid medium from the first and second suction pipes into the tank when a respective one or more of the first and second suction pumps is stationary.

8. The suction arrangement according to claim 1, further comprising:
    a filling level sensor in a region of the first end of at least one of the first and second suction pipes adjacent to the suction basket.

9. The suction arrangement according to claim 1, wherein the suction basket is made of a relatively heavy, metallic material, and the first and second suction pipes are made of a relatively light material.

* * * * *